(12) United States Patent
Rosenberg

(10) Patent No.: US 9,154,329 B2
(45) Date of Patent: Oct. 6, 2015

(54) METHODS AND APPARATUS TO SELECTIVELY ASSIGN ROUTING TABLES TO ROUTER LINECARDS

(75) Inventor: Eric Rosenberg, Lincroft, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 875 days.

(21) Appl. No.: 12/479,456

(22) Filed: Jun. 5, 2009

(65) Prior Publication Data
US 2010/0309920 A1 Dec. 9, 2010

(51) Int. Cl.
H04L 12/46 (2006.01)
H04L 12/701 (2013.01)
H04L 12/755 (2013.01)
H04L 12/721 (2013.01)
H04L 12/761 (2013.01)
H04L 12/723 (2013.01)

(52) U.S. Cl.
CPC ............ *H04L 12/4675* (2013.01); *H04L 45/00* (2013.01); *H04L 45/021* (2013.01); *H04L 45/123* (2013.01); *H04L 45/16* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,034,946 A * | 3/2000 | Roginsky et al. | 370/238 |
| 6,744,775 B1 | 6/2004 | Beshai et al. | |
| 7,035,256 B1 | 4/2006 | Neufeld et al. | |
| 7,450,505 B2 | 11/2008 | Buchanan et al. | |
| 2003/0048794 A1 | 3/2003 | Sato et al. | |
| 2005/0265308 A1 * | 12/2005 | Barbir et al. | 370/351 |
| 2007/0097973 A1 | 5/2007 | Scudder et al. | |
| 2007/0153699 A1 | 7/2007 | Fernando et al. | |
| 2008/0198859 A1 * | 8/2008 | Elias et al. | 370/401 |
| 2008/0250099 A1 | 10/2008 | Shen et al. | |
| 2009/0028068 A1 | 1/2009 | Chen et al. | |
| 2009/0028166 A1 | 1/2009 | Pushparaj et al. | |
| 2009/0213867 A1 * | 8/2009 | Devireddy et al. | 370/419 |

OTHER PUBLICATIONS

Cisco, "Selective MVRF Download Feature on Cisco 12000 Series Routers," Aug. 28, 2006 (14 pages).
Erlenkotter, Donald "A Dual-Based Procedure for Uncapacitated Facility Location," Operations Research, vol. 26, No. 6, Nov.-Dec. 1978 (18 pages).

* cited by examiner

*Primary Examiner* — Chirag Shah
*Assistant Examiner* — Daniel Mitchell
(74) *Attorney, Agent, or Firm* — Hanley, Flight & Zimmerman, LLC

(57) ABSTRACT

Methods and apparatus to selectively assign routing tables to router linecards are disclosed. A disclosed example method includes computing costs associated with assigning routing information for two or more subsets of virtual private networks (VPNs) to each of two or more subsets of linecards of a router, solving an incapacitated facility location problem defined by the computed costs to determine an assignment of a particular subset of the VPNs to a particular subset of the linecards of the router, and configuring the particular subset of the linecards of the router with routing information for the particular subset of the VPNs.

11 Claims, 9 Drawing Sheets

METHODS AND APPARATUS TO SELECTIVELY ASSIGN ROUTING TABLES TO ROUTER LINECARDS

FIELD OF THE DISCLOSURE

This disclosure relates generally to routing tables and, more particularly, to methods and apparatus to selectively assign routing tables to router linecards.

BACKGROUND

Enterprise customers are increasingly adopting virtual private network (VPN) services to implement a communication network among their respective customer sites via a service provider's network. Such VPNs can provide direct any-to-any reachability among an enterprise's customer sites. In some examples, an enterprise customer may implement more than one VPN via the service provider's network.

DETAILED DESCRIPTION

Figure 1:
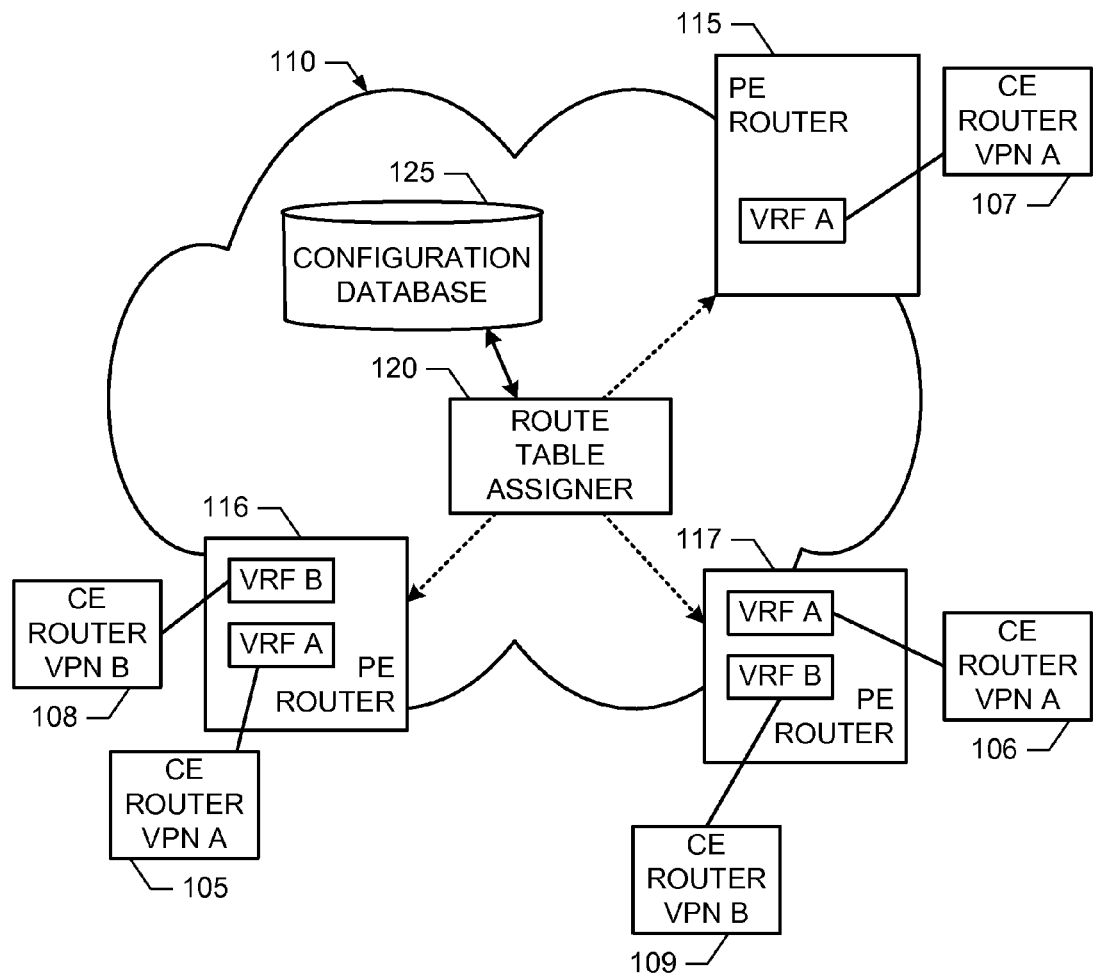
FIG. 1 is a schematic illustration of example multiprotocol label switching (MPLS) based communication system constructed in accordance with the teachings of this disclosure.

Example methods and apparatus to selectively assign routing tables to router linecards are disclosed. A disclosed example method includes computing costs associated with assigning routing information for two or more subsets of virtual private networks (VPNs) to each of two or more subsets of linecards of a router, solving an uncapacitated facility location problem defined by the computed costs to determine an assignment of a particular subset of the VPNs to a particular subset of the linecards of the router, and configuring the particular subset of the linecards of the router with routing information for the particular subset of the VPNs.

A disclosed example apparatus includes a schema identifier to define a first non-empty subset of linecards of a router and to define a second non-empty subset of the linecards of the router, wherein the second subset of the linecards differs from the first subset of the linecards, a subset identifier to identify a first subset of VPNs having all their associated interfaces implemented by the first subset of the linecards and to identify a second subset of the VPNs having all their associated interfaces implemented by the second subset of the linecards, a cover analyzer to compute a first cost of assigning routing information for the first subset of the VPNs to the first subset of the linecards, to compute a second cost of assigning routing information for the second subset of the VPNs to the first subset of the linecards, to compute a third cost of assigning routing information for the first subset of the VPNs to the second subset of the linecards, and to compute a fourth cost of assigning routing information for the second subset of the VPNs to the second subset of the linecards, an optimizer to determine whether to assign the first subset of the VPNs to the first subset of the linecards or to the second subset of the linecards based on the first, second, third, and fourth costs, and a router interface to configure the first subset of the linecards of the router with routing information for the first subset of the VPNs based on an output of the optimizer.

A disclosed example article of manufacture stores machine readable instructions that, when executed, cause a machine to define a first non-empty subset of linecards of a router, define a second non-empty subset of the linecards of the router, wherein the second subset of the linecards differs from the first subset of the linecards, identify a first subset of VPNs having all their associated interfaces implemented by the first subset of the linecards, identify a second subset of the VPNs having all their associated interfaces implemented by the second subset of the linecards, compute a first cost of assigning routing information for the first subset of the VPNs to the first subset of the linecards, compute a second cost of assigning routing information for the second subset of the VPNs to the first subset of the linecards, compute a third cost of assigning routing information for the first subset of the VPNs to the second subset of the linecards, compute a fourth cost of assigning routing information for the second subset of the VPNs to the second subset of the linecards, determine whether to assign the first subset of the VPNs to the first subset of the linecards or to the second subset of the linecards based on the first, second, third, and fourth costs, and configure the first subset of the linecards of the router with routing information for the first subset of the VPNs when the first subset of the VPNs is assigned to the first subset of the linecards.

In the interest of brevity and clarity, throughout the following disclosure references will be made to VPNs and an example multiprotocol label switched (MPLS) based communication system 100 of FIG. 1. However, the methods and apparatus described herein to selectively assign routing tables to router linecards are applicable to other types of networks constructed using other network technologies, topologies and/or protocols.

FIG. 1 illustrates the example communication system 100. To facilitate communication services between a plurality of customer edge (CE) routers, five of which are designated at reference numerals 105, 106, 107, 108, and 109, the example communication system 100 of FIG. 1 includes a MPLS based service-provider network 110. In the illustrated example of FIG. 1, the example CE routers 105-107 are associated with a VPN A, and the example CE routers 108 and 109 are associated with a VPN B.

To route and/or transport data between and/or among the example CE routers 105-109, the example MPLS-based service-provider network 110 of FIG. 1 includes a plurality of provider edge (PE) routers, three of which are designated at reference numerals 115, 116, and 117. The example PE routers 115-117 of FIG. 1 are communicatively coupled to each other via any number and/or type(s) of communication paths (not shown) that allow any particular PE router 115-117 to communicate with at least some, but not necessarily all of, the other PE routers 115-117.

For each VPN implemented by the MPLS-based service-provider network 110, each of the example PE routers 115-117 of FIG. 1 has a corresponding VPN routing and forwarding (VRF) table. For instance, for the VPN A the PE routers 115-117 have a VRF A, and for the VPN B the PE routers 116 and 117 have a VRF B. The VRF tables A and B are used by the PE routers 115-117 to route and/or forward a packet received at a particular PE router 115-117 toward its final destination. In general, when a packet is received at a PE router 115-117 from a CE router 105-109 associated with a particular VPN, the PE router 115-117 uses the final destination specified and/or identified in the packet to perform a query of the VRF table associated with that VPN. Based on a result of the query, the PE router 115-117 determines how the packet is to be routed or forwarded within the service provider network 110, and/or delivered to a particular CE router 105-109.

Each of the example PE routers 115-117 of FIG. 1 implements and/or is implemented by any number and/or type(s) of linecards (not shown). Each linecard may implement any number and/or type(s) of interfaces that may be used to communicatively couple customer equipment, such as the CE routers 105-109, to the PE router 115-117. At a particular PE router 115-117, any VPN may have equipment communicatively coupled to any number and/or type(s) of interfaces on any number and/or type(s) of linecards of the PE router 115-117. For example, a VPN may not have any associated equipment coupled to any interface of any linecard of a particular PE router 115-117, may have associated equipment coupled to one or more interfaces on each linecard of that PE router 115-117, and/or may have associated equipment coupled to one or more interfaces on a subset of the linecards of that PE router 115-117.

Traditionally, each linecard of a PE router 115-117 creates, stores, maintains, and/or utilizes a VRF table for each VPN having one or more interfaces on that PE router 115-117. However, such traditional methods result in the storage of a VRF table for a particular VPN on each and every linecard even though that VPN may not be coupled to each linecard of the PE router 115-1176.

To reduce the memory required to store VRF tables on the linecards of the example PE routers 115-117, the example service-provider network 110 of FIG. 1 includes a route table assignor 120. While a single route table assignor 120 is illustrated in FIG. 1, the example service-provider network 110 may include any number of route table assignors 120. For example, a route table assignor 120 may be located at each of the PE routers 115-117, at a subset of the PE routers 115-117, etc. An example manner of implementing the example route table assignor 120 is described below in connection with FIGS. 3-10. In general, the interface(s) to which a VPN is connected may be different at each PE router 115-117. Accordingly, in the examples described herein, the example route table assignor 120 determines the assignment of routing information to linecards separately for each PE router 115-117.

For each PE router 115-117, the example route table assignor 120 of FIG. 1 determines, assigns and/or indicates which linecard(s) are to create, store, update and/or maintain VRF table(s) for which VPN(s). In other words, the example route table assignor 120 assigns routing information for particular VPNs to particular linecards of the PE router 115-117 rather than simply storing all routing information for all VPNs on all linecards. For instance, in the illustrated example of FIG. 1, the example route table assignor 120 may indicate and/or specify particular linecards of the example PE router 115 that need to create, store, update and/or maintain a VRF table for VPN A. Likewise, were devices associated with VPN A only communicatively coupled to a portion of the linecards of the example PE router 116, the route table assignor 120 can indicate to the PE router 116 which linecard(s) of PE router 116 need to create, store, update and/or maintain a VRF table for VPN A.

The assignment of routing information to PE router linecards can be affected using any number and/or type(s) of method(s), criteria, rule(s) and/or logic. In some examples, a multicast group is assigned to each VPN for each PE router 115-117. Each of the multicast groups downloads one or more VRF tables to a given subset of linecards. The route processor card of each of the PE routers 115-117 receives VRF table information for each VPN via its associated multicast group, and determines which VRF table(s) should be created, stored, updated and/or maintained on which of its linecards. However, there are potentially thousands of multicast groups even when there are only tens of linecards in a PE router 115-117. Many of these multicast groups may never be used. The computational requirements to handle and/or process such a large number of multicast groups can become burdensome.

In still other examples, the VRF table for a VPN is sent to each linecard of a particular PE router 115-117 to which one or more devices associated with the VPN are coupled to at least one interface of that PE router 115-117. In response, each linecard determines which VRF table(s) to maintain in memory and which to discard. However, this approach places a high computational burden on linecard processors.

In a preferred example, an optimization problem is defined and solved to determine which routing information is assigned to which linecard(s). An example optimization problem balances two competing objectives: (1) saving memory by not downloading a VRF table to a linecard that does not need that VRF table, and (2) minimizing processor usage by not creating a multicast group for every VPN. The first objective represents the cost of storing a VRF table on linecards. For a given VRF table, this cost increases with the size of the VRF table and the number of linecards on which the VRF table is stored. The second objective reflects a cost associated with the handling and/or processing of each multicast group. This cost reflects that each time a route is added/deleted for a VPN, VRF table update information for the VPN is distributed via the multicast group and processed at the PE router 115-117. In examples described below, these two criteria, memory consumption and processor utilization, are balanced and/or traded-off against each other via a configurable and/or selectable parameter $\alpha$. For example, the route table assignor 120 may assign routing information for a subset of the VPNs of the service-provider network 110 to a particular subset $j$ of linecards of a presently considered PE router 115-117, even though not every VPN in the subset has an interface on each linecard in the subset $j$ of linecards. By grouping the subset of VPNs into a single multicast group, processing overhead can be lowered, albeit at the expense of increased memory. In particular, a VRF table may be assigned to a linecard via the multicast group even though the associated VPN uses no interfaces of the linecard.

While the examples described herein utilize multicast groups, any other additional and/or alternative method(s) may be used to provide one or more VRF table(s) to one or more linecards. A multicast group is merely an example method of how to provide routing information to specific linecards and/or specific PE routers 115-117. Moreover, while the examples discussed herein describe downloading VRF tables to linecards, any other additional and/or alternative method(s) may be used to assign and/or provide routing information to linecards. In general, the PE router 115-117 and/or the linecards create, update and/or maintain the VRF table(s) under the control of the example route table assignor 120.

To store configuration information, the example service-provider network 110 of FIG. 1 includes any number and/or type(s) of configuration databases, one of which is designated at reference numeral 125. The example configuration database 125 of FIG. 1 contains, among other information, data and/or parameters that represent to which interface(s) on which linecard(s) of which PE router(s) 115-117 equipment associated with particular VPNs are communicatively coupled. In some examples there is a configuration database 125 implemented for each PE router 115-117. Configuration information may be stored in the configuration database 125 using any number and/or type(s) of data structures, and the configuration database 125 may be implemented by any number and/or type(s) of tangible computer-readable tangible media, such as volatile memory, non-volatile memory, a memory device and/or a storage device.

For a presently considered PE router 115-117, the example route table assignor 120 of FIG. 1 uses information contained in the configuration database 125 to identify one or more subsets j of linecards. A subset j of linecards of the PE router 115-117 is also referred to herein as download schema j, as the subset j defines a group of linecards to which routing information can be downloaded and/or assigned via an associated multicast group. A download schema j is defined by the subset of linecards belonging to the schema j. An example download schema j is the set {1, 3, 6, 7} representing a combination of linecard #1, linecard #3, linecard #6 and linecard #7. As used herein, S refers to the set of all download schemas j, that is, download schema j is a member of S (j∈S). The set S of download schemas j may be selected, identified and/or determined using any number and/or type(s) of method(s), criteria and/or logic. For example, the set S of download schemas j may be manually selected, may be randomly selected, and/or may be adaptively determined based on analyzing past download schemas j to which routing information has been assigned.

For a presently considered PE router 115-117, the example route table assignor 120 of FIG. 1 also uses information contained in the configuration database 125 to identify a subset V(j) of VPNs corresponding to particular download schema j. Each VPN v in the subset V(j) (v∈V(j)) has at least one interface on every linecard of the download schema j, and does not have an interface on any linecard not included in download schema j. For example, if download schema j corresponds to the subset of linecards {3, 5, 6}, then V(j) is the subset of all VPNs having interfaces on each of and only on linecards #3, #5 and #6. Likewise, if example VPN #121 only has interfaces on linecards #3, #5 and #6, and download schema #15 is {2, 3, 4, 6}, then VPN #121 is not in V(15). Each of the VPN subsets V(j) belongs to the set V, that is, V(j)⊂V.

Let i be a given download schema (i∈S) and let j be another potentially different download schema (j∈S). In a preferred example, j is selected to be a "cover" for i, which means that the set of linecards defined by schema i is a subset of the set of linecards defined by schema j. That is, the download schema j has to include every linecard in the download schema i, and may include additional linecards not in the download schema i. Because each download schema is a cover for itself, i and j may refer to the same download schema. The example route table assignor 120 of FIG. 1 assigns the VPN subsets V(i) to the download schema j, where download schema j covers download schema i. This means that the VRF table for each v ∈ V(i) is downloaded to each linecard in schema j. Let S(i) be the set of download schemas that are covers for schema i. That is, if j∈S(i), then schema j is a cover for schema i. The set S(i) is a subset of S, the set of all schemas. For example if download schema i is {3, 6}, then S(i) could include download schemas {3, 6}, {2, 3, 6} and {1, 3, 6, 7}.

Figure 2:
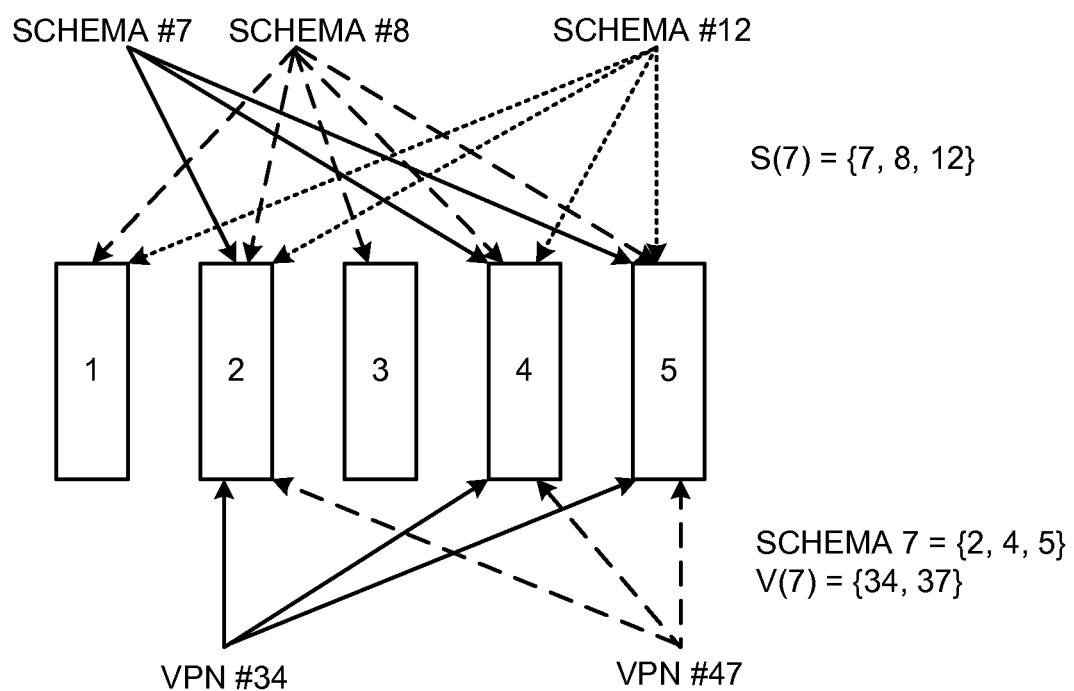
FIG. 2 illustrates example subset coverings for VPNs by download schemas.

An example VPN subset V(i) and example covering download schemas j are illustrated in FIG. 2. In FIG. 2 an example download schema i=7 includes linecards #2, #4 and #5, and the corresponding VPN subset V(i=7) includes VPN #34 and VPN #47. As shown, download schemas 7, 8 and 12 cover download schema i=7 and, thus, S(i∈7)={7, 8, 12}.

Returning to FIG. 1, the example route table assignor 120, for each particular i∈S and j∈S, computes the cost c(i, j) associated with assigning routing information for the particular subset V(i) of VPNs to the particular download schema j (i.e., a particular subset j of the linecards of a PE router 115-117), and the cost f(j) associated with the download schema j. Based on the computed costs c(i,j) and f(j), the route table assignor 120 determines whether to assign the subset V(i) of VPNs to the download schema j. In some examples, the assignment is determined by solving an optimization problem that is generally expressible as an integer problem, but is more preferably expressed in the form of the uncapacitated facility location (UFL) problem. As used herein, the meaning of the phrases "uncapacitated facility location problem" and "UFL problem," are consistent with their ordinary, well-known and widely accepted meanings. The UFL problem can be expressed canonically with the following mathematical expressions:

$$\min \sum_{i \in S} \sum_{j \in S} c(i, j) x(i, j) + \alpha \sum_{j \in S} f(j) y(j) \text{ such that} \qquad \text{EQN (1)}$$

$$\sum_{j \in S} x(i, j) = 1 \ \forall \ i \in S; \qquad \text{EQN (2)}$$

$$x(i, j) \le y(j) \ \forall \ i \in S \text{ and } j \in S; \text{ and} \qquad \text{EQN (3)}$$

$$x(i, j) = 0 \text{ or } 1 \ \forall \ i \in S \text{ and } j \in S. \qquad \text{EQN (4)}$$

In EQNS (1)-(4), c(i, j) represents the cost associated with assigning subset V(i) of VPNs to download schema j; f(j) represents the cost associated with download schema j; x(i, j) equals 1 if the subset V(i) of VPNs is assigned to download schema j, or 0 otherwise; y(j) equals 1 if download schema j is used, or 0 otherwise; and α is the configurable parameter selected to tradeoff memory consumption and processor utilization.

The cost c(i, j) of assigning routing information for subset V(i) of VPNs to download schema j is a sum of products of the number of routes in a VPN's VRF table and the number of linecards in the download schema j. In particular, the cost c(i, j) can be mathematically expressed as:

$$c(i, j) = \begin{cases} \sum_{v \in V(i)} r(v) n(j), & \text{if } j \text{ is cover for } i \\ \infty & \text{otherwise,} \end{cases} \qquad \text{EQN (5)}$$

where r(v) is the number of routes in the VRF table for VPN v, n(j) is the number of linecards in the download schema j, and v is selected from the subset V(i) of VPNs having interfaces in precisely those line cards defined by download schema i.

In some examples, the cost f(j) is proportional to the size of the download schema j. In other examples, the cost f(j) is constant, that is, independent of the number of linecards in download schema j.

While the UFL problem defined in the mathematical expressions of EQNS (1)-(4) can be solved exactly, there is no specific need to solve it exactly. Instead, any number and/or type(s) of heuristic(s) and/or approximation(s) may be used to determine a routing table assignment, that is, to determine $x(i, j)$ and $y(j)$ values. An example heuristic that may be used to solve the UFL problem is described by D. Erlenkotter, in "A Dual-Based Procedure for Uncapacitated Facility Location", Operations Research, Vol. 26, 1978, pp. 992-1009, which is hereby incorporated by reference in its entirety.

The values $x(i, j)$ and $y(j)$ define which multicast groups (i.e., download schemas j) will be used to provide routing information to particular linecards, and define which VPNs $V(i)$ have their routing table information provided via which multicast group j. If a particular $x(i, j)$ value is one, the VPNs $V(i)$ have their routing information stored on the linecards in download schema j.

While the examples disclosed herein assign subsets $V(i)$ of VPNs to download schemas j, the methods and apparatus described herein can alternatively be used to assign each VPN individually to a download schema j. However, the size of the optimization problem that must be solved becomes accordingly larger.

Figure 3:
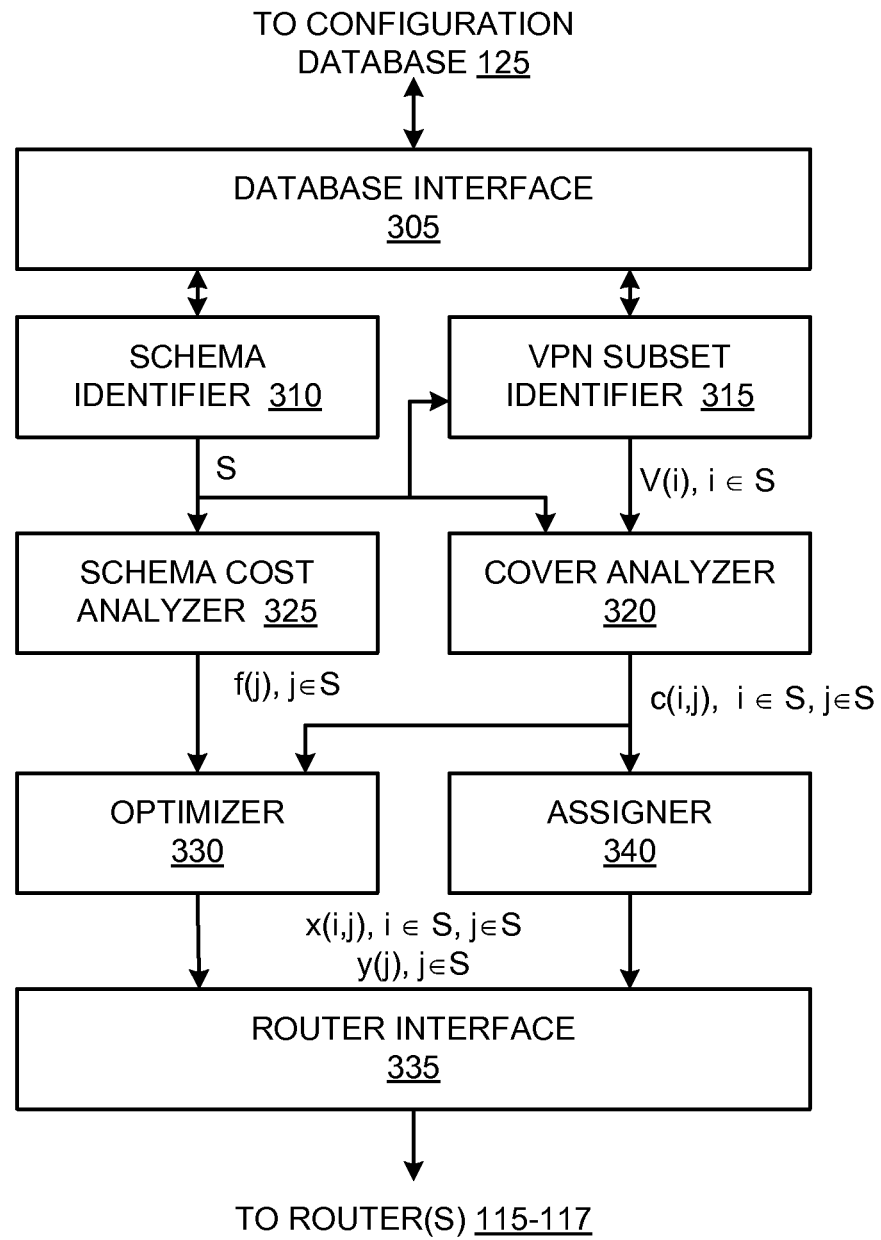
FIG. 3 illustrates an example manner of implementing the example route table assignor of FIG. 1.

FIG. 3 illustrates an example manner of implementing the example route table assignor 120 of FIG. 1. Example machine-accessible instructions that can be executed to implement the example route table assignor 120 of FIGS. 1 and 3 are described below in connection with FIGS. 4 and 5.

To query and/or obtain configuration information for a presently considered PE router 115-117, the example route table assignor 120 of FIG. 3 includes any number and/or type(s) of database interfaces, one of which is designated at reference numeral 305. The example database interface 305 of FIG. 3 implements any number and/or type(s) of application programming interface(s) (API(s)) to facilitate the query for router configuration data and/or information stored in the example configuration database 125.

To identify download schemas j, the example route table assignor 120 of FIG. 3 includes a schema identifier 310. Based on router configuration information and/or data obtained via the example database interface 305 and using any number and/or type(s) of method(s), criteria and/or logic, the example schema identifier 310 of FIG. 3 identifies one or more download schemas j of a set of schemas S for consideration. Each download schema j represents different subset of linecards of a presently considered PE router 115-117. Example machine-accessible instructions that can be executed to implement the example schema identifier 310 of FIG. 3 are described below in connection with FIG. 6.

To identify a subset $V(i)$ of VPNs corresponding to each download schema i, the example route table assignor 120 of FIG. 3 includes a VPN subset identifier 315. Based on router configuration information and/or data obtained via the example database interface 305 and using any number and/or type(s) of method(s), criteria and/or logic, for each download schema i of the set S the example VPN subset identifier 315 identifies the subset $V(i)$ of VPNs wherein each VPN is communicatively coupled to at least one interface on each and every linecard in the download schema i and is not communicatively coupled to any linecard not in the download schema i. Example machine-accessible instructions that can be executed to implement the example VPN subset identifier 315 of FIG. 3 are described below in connection with FIG. 7.

To determine the cost $c(i, j)$ associated with assigning a particular VPN subset $V(i)$ to a download schema j, the example route table assignor 120 of FIG. 3 includes a cover analyzer 320. Using, for example, the mathematical expressions of EQN (5), the example cover analyzer 320 determines the cost $c(i, j)$ of assigning VPN subset $V(i)$ to download schema j, for each schema j in S and for each schema i in S. Example machine-accessible instructions that can be executed to implement the example cover analyzer 320 of FIG. 3 are described below in connection with FIG. 8.

To determine the cost associated with a download schema, the example route table assignor 120 of FIG. 3 includes a schema cost analyzer 325. Using any number and/or type(s) of method(s), criteria and/or logic, the example schema cost analyzer 325 determines the cost $f(j)$ associated with each download schema j in the set S. In some examples, the cost $f(j)$ is proportional to the size of the download schema j. In other examples, the cost $f(j)$ is constant, that is, independent of the number of linecards in download schema j. Example machine-accessible instructions that can be executed to implement the example schema cost analyzer 325 of FIG. 3 are described below in connection with FIG. 9.

To determine to which download schema j each VPN subset $V(i)$ is assigned, the example route table assignor 120 includes an optimizer 330. The example optimizer 330 of FIG. 3 solves the example UFL problem of EQNs (1)-(4) to determine routing table assignments, that is, $x(i, j)$ and $y(j)$ values. In some examples, the example optimizer 330 uses the heuristic described by Erlenkotter to solve the UFL problem of EQNs (1)-(4).

To configure the presently considered PE router 115-117 based on the routing table assignments $x(i, j)$ and $y(j)$ determined by the example optimizer 330, the example route table assignor 120 of FIG. 3 includes any number and/or type(s) of router interfaces, one of which is designated at reference numeral 335. The example router interface 335 of FIG. 3 sends one or more command(s), variable(s) and/or parameter(s) to the PE router 115-117 that identifies the VRF tables that are to be created, stored, maintained and/or updated on which linecard(s) in the PE router 115-117. The command(s), variable(s) and/or parameter(s) used to instruct the PE router 115-117 may depend on the particular manufacturer and/or model of the PE router 115-117.

To assign routing tables for newly configured interfaces, the example route table assignor 120 of FIG. 3 includes an assignor 340. When an interface is configured for a particular VPN, the example assignor 340 of FIG. 3 determines whether the VPN is communicatively coupled to another interface on the same linecard. If so, no action change in routing table assignment needs to occur. If the additional interface is on a linecard not already in use by the VPN, the assignor 340 assigns the VPN to the download schema j that covers, with lowest cost, the new subset of linecards associated with the VPN. Example machine-accessible instructions that can be executed to implement the example assignor 340 of FIG. 3 are described below in connection with FIG. 10.

While an example manner of implementing the example route table assignor 120 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, the example database interface 305, the example schema identifier 310, the example VPN subset identifier 315, the example cover analyzer 320, the example schema cost analyzer 325, the example optimizer 330, the example assignor 340, the example router interface 335 and/or, more generally, the example route table assignor 120 of FIG. 3 may be implemented by hardware, software, firmware and/or any combination of hardware, software and/or firmware. Thus, for example, any of the example database interface 305, the example schema identifier 310, the example VPN subset identifier 315, the example cover analyzer 320, the example schema cost analyzer 325, the example optimizer 330, the example assignor 340, the example router interface 335 and/or, more generally, the example route table assignor 120 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any claim of this patent incorporating one or more of these elements is read to cover a purely software and/or firmware implementation, at least one of the example database interface 305, the example schema identifier 310, the example VPN subset identifier 315, the example cover analyzer 320, the example schema cost analyzer 325, the example optimizer 330, the example assignor 340, the example router interface 335 and/or, more generally, the example route table assignor 120 are hereby expressly defined to include a tangible computer-readable medium. Example tangible computer-readable media include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 11. Combinations of the above are also included within the scope of tangible computer-readable media. Further still, the example route table assignor 120 may include interfaces, data structures, elements, processes and/or devices instead of, or in addition to, those illustrated in FIG. 3 and/or may include more than one of any or all of the illustrated interfaces, data structures, elements, processes and/or devices.

FIGS. 4-10 illustrate example machine-accessible instructions that may be executed to implement the example route table assignor 120 of FIGS. 1 and 3. A processor, a controller and/or any other suitable processing device may be used and/or programmed to execute the example machine-accessible instructions of FIGS. 4-10. For example, the machine-accessible instructions of FIGS. 4-10 may be embodied in coded instructions stored on any number and/or type(s) of tangible computer-readable media such as those described above in connection with FIG. 3. Machine-readable instructions comprise, for example, instructions and data that cause a processor, a computer and/or a machine have a processor to perform one or more particular processes. Alternatively, some or all of the example machine-accessible instructions of FIGS. 4-10 may be implemented using any combination(s) of ASIC(s), PLD(s), FPLD(s), FPGA(s), discrete logic, hardware, firmware, etc. Also, some or all of the example processes of FIGS. 4-10 may be implemented manually or as any combination of any of the foregoing techniques, for example, any combination of firmware, software, discrete logic and/or hardware. Further, many other methods of implementing the example operations of FIGS. 4-10 may be employed. For example, the order of execution of the blocks may be changed, and/or one or more of the blocks described may be changed, eliminated, sub-divided, or combined. Additionally, any or all of the example machine-accessible instructions of FIGS. 4-10 may be carried out sequentially and/or carried out in parallel by, for example, separate processing threads, processors, devices, discrete logic, circuits, etc.

Figure 4:
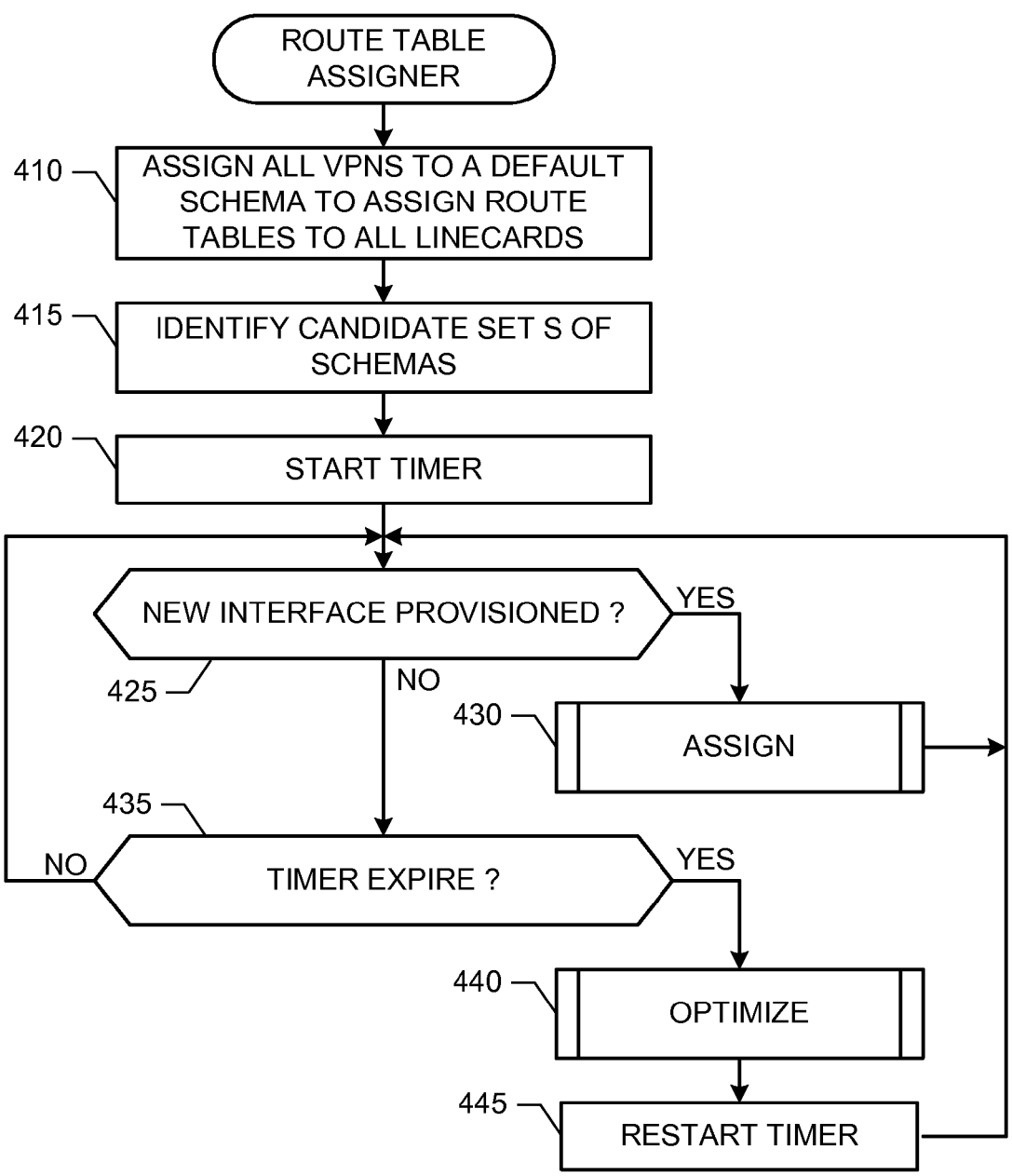
FIGS. 4-10 are flowcharts representative of example machine-accessible instructions that may be executed by, for example, a processor to implement the example route table assignors of FIGS. 1 and 3.

The example machine-accessible instructions of FIG. 4 may be executed for each of the example PE routers 115-117 of FIG. 1. The example router table assignor 120 initially assigns all VPNs to a default download schema that assigns the routing tables for all VPNs to all linecards (block 410). The example schema identifier 310 of FIG. 3 identifies a candidate set S of download schemas (block 415), and the example optimizer 330 of FIG. 3 starts a timer (block 420). An example timer duration is 24 hours, such that the optimizer 330 is executed every night at 1 AM.

Figure 10:
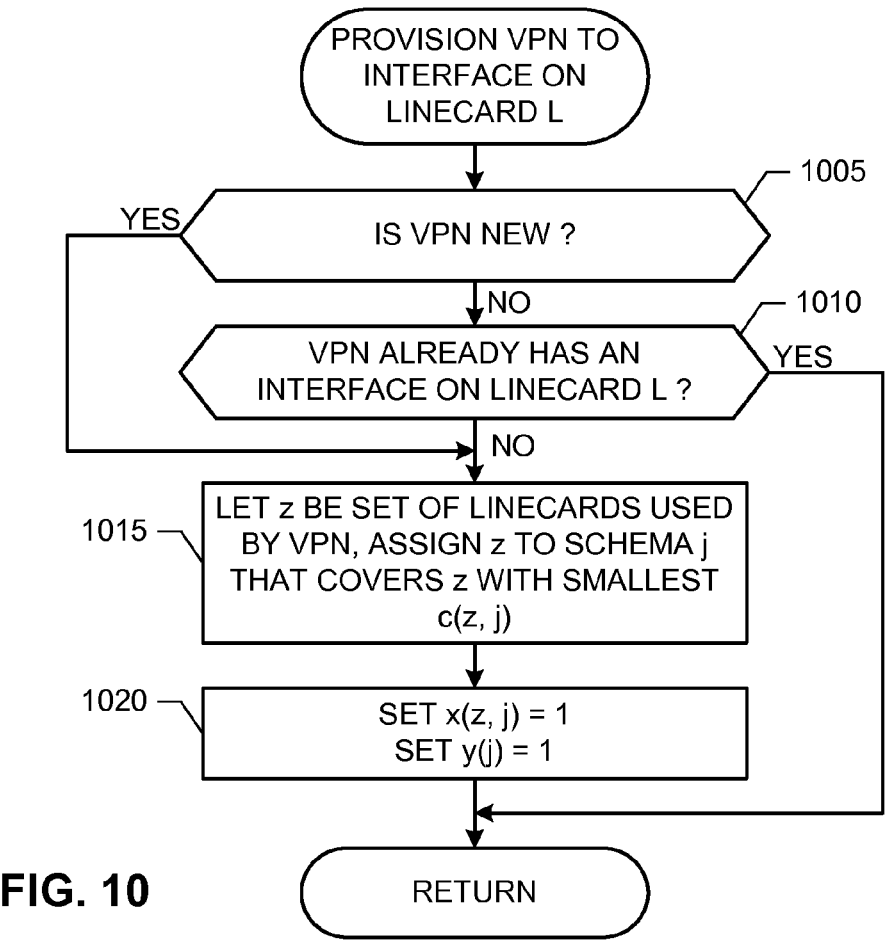

If a new interface is provisioned for a VPN (block 425), the example assignor 340 determines whether the routing information for the VPN needs to be assigned to an additional linecard by, for example, executing the example machine-accessible instructions of FIG. 10 (block 430). Control then returns to block 425 to determine whether a new interface was provisioned.

Figure 5:
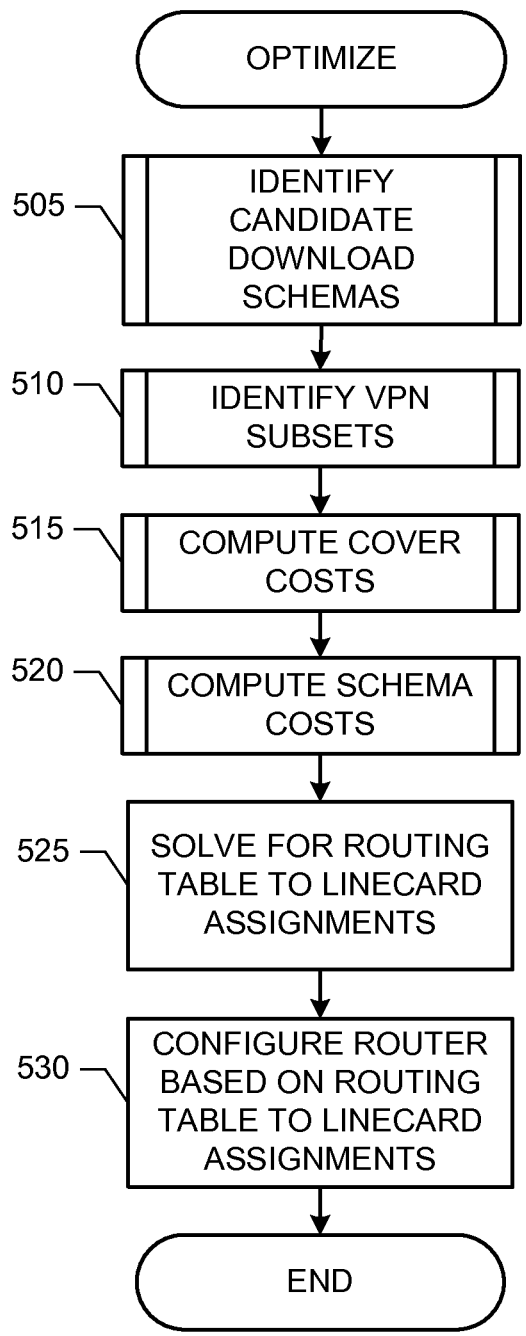

If a new interface was not provisioned (block 425) and the timer has expired (block 435), the optimizer 330 re-optimizes and/or re-assigns routing information to linecards by, for example, executing the example machine-accessible instructions of FIG. 5 (block 440). The timer is restarted (block 445), and control returns to block 425 to determine whether a new interface was provisioned.

The example machine-accessible instructions of FIG. 5 may be executed to re-determine and/or re-assign routing information to linecards of a presently considered PE router 115-117. The example machine-accessible instructions of FIG. 5 are executed when, for example, called from the example machine-accessible instructions of FIG. 4 at block 440. The example machine-accessible instructions of FIG. 5 begin with the example schema identifier 310 identifying and/or updating a set S of candidate download schemas by, for example, executing the example machine-accessible instructions of FIG. 6 (block 505).

Figure 7:
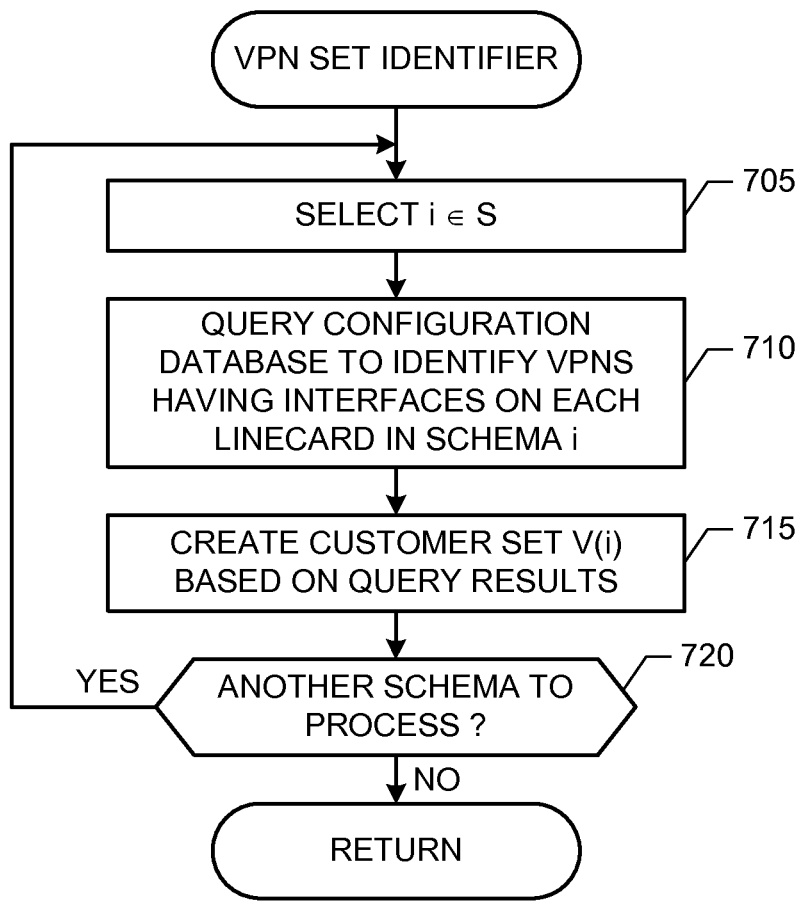

The example VPN subset identifier 315 identifies VPN subsets V(i) corresponding to each of the candidate download schemas i by, for example, executing the example machine-accessible instructions of FIG. 7 (block 510). The example cover analyzer 320 computes the cost c(i, j) of assigning each of the VPN subsets V(i) to a particular download schema j by, for example, executing the example machine-accessible instructions of FIG. 8 (block 515). The example schema cost analyzer 325 computes the cost f(j) associated with each of the candidate download schemas j by, for example, executing the example machine-accessible instructions of FIG. 9 (block 520).

The example optimizer 330 defines and solves an UFL optimization problem as described in EQNs (1)-(4) based on the computed costs c(i, j) and f(j) by carrying out, for example, the heuristic algorithm described by Erlenkotter (block 525). Based on the computed values x(i, j) and y(j) that assign VPN subsets V(i) to download schemas j computed at block 525, the router interface 335 configures the presently considered PE router 115-117 (block 530). Control then exits from the example machine-accessible instructions of FIG. 5 to, for example, the example machine-accessible instructions of FIG. 4 at block 445.

Figure 6:
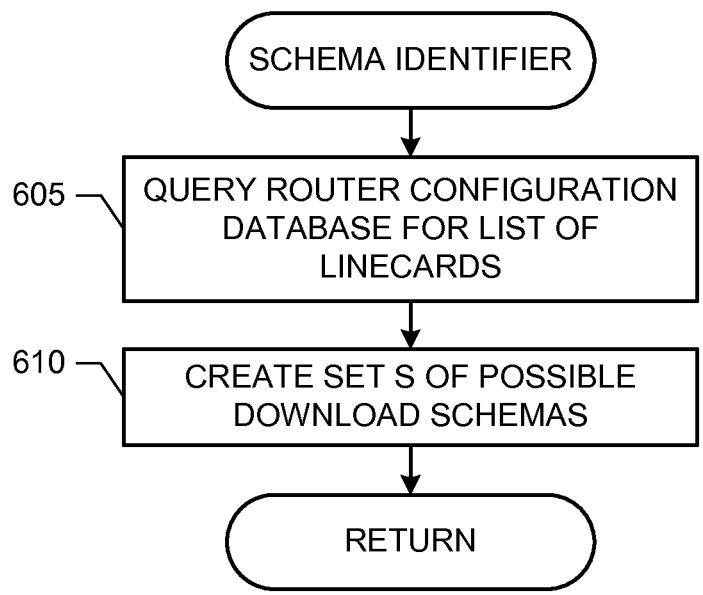

The example machine-accessible instructions of FIG. 6 may be executed to implement the example schema identifier 310 of FIG. 3. The example machine-accessible instructions of FIG. 6 are executed when, for example, called from the example machine-accessible instructions of FIG. 5 at block 505. The example schema identifier 310 queries the configuration database 125 via the example database interface 305 for data indicating which VPNs are communicatively coupled to which interfaces of which linecards (block 605). Based on the data and/or information obtained from the configuration database 125, the schema identifier 310 creates and/or identifies a set S of candidate download schemas (block 610). Control then exits from the example machine-accessible instructions of FIG. 6 to, for example, the example machine-accessible instructions of FIG. 5 at block 510.

The example machine-accessible instructions of FIG. 7 may be executed to implement the example VPN subset identifier 315 of FIG. 3. The example machine-accessible instructions of FIG. 7 begin when, for example, called from the example machine-accessible instructions of FIG. 5 at block 510. The example VPN subset identifier 315 selects a first download schema i from the set S (block 705). The example VPN subset identifier 315 queries the configuration database 125 via the example database interface 305 to identify all VPNs having interfaces on each of and only on the linecards in download schema i (block 710). The VPN subset identifier 315 creates a VPN subset V(i) based on the identified VPNs (block 715). If there are additional download schemas i to process (block 720), control returns to block 705 to process the next download schema. If there are no more download schemas to process (block 720), control returns from the example machine-accessible instructions of FIG. 7 to, for example, the example machine-accessible instructions of FIG. 5 at block 515.

Figure 8:
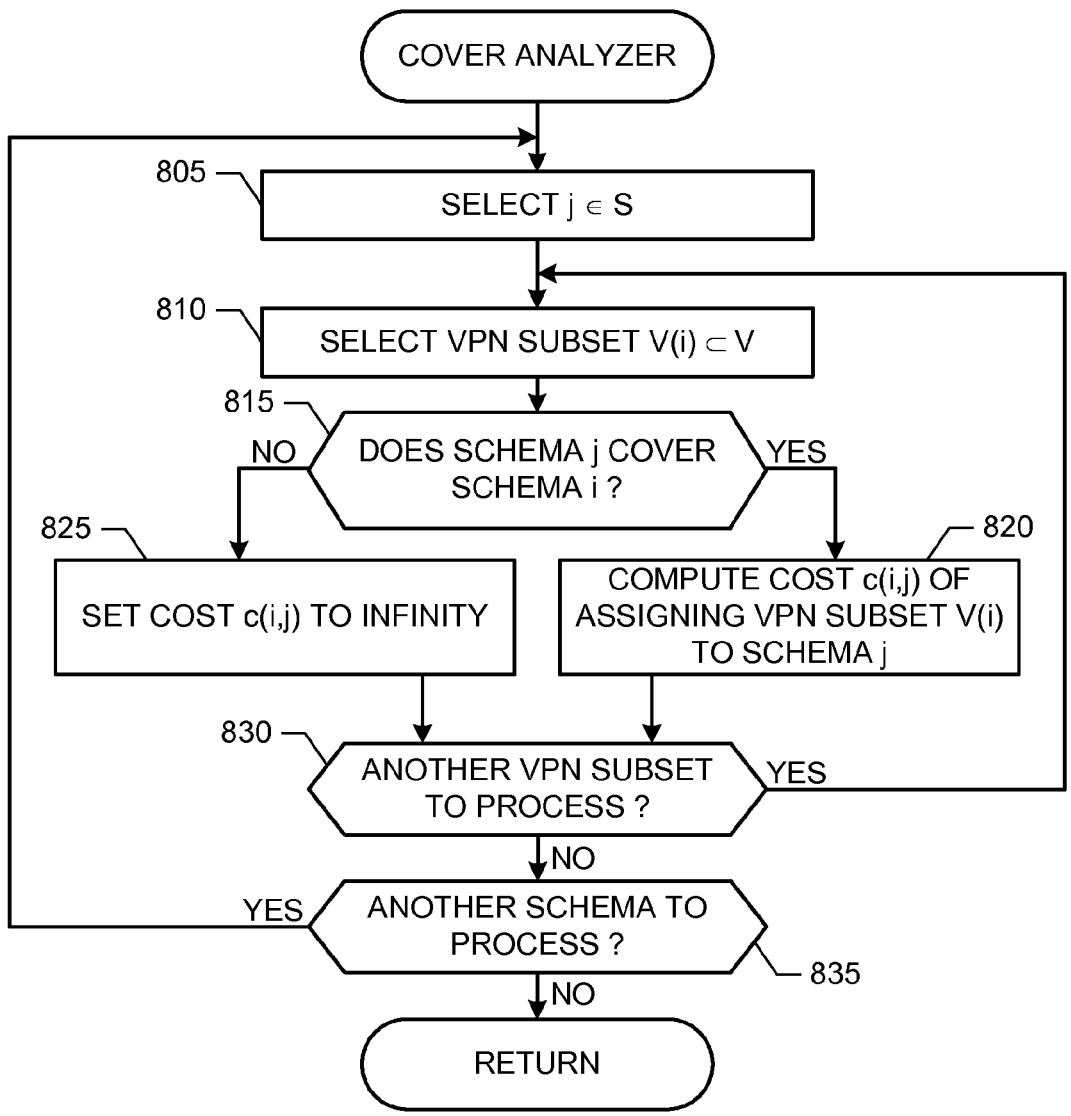

The example machine-accessible instructions of FIG. 8 may be executed to implement the example cover analyzer 320 of FIG. 3. The example machine-accessible instructions of FIG. 8 begin, for example, when called from the example machine-accessible instructions of FIG. 5 at block 515. The cover analyzer 330 selects a first download schema j from the set S (block 805), and selects a first VPN subset V(i) from the set V (block 810).

The cover analyzer 330 determines whether the currently considered download schema j covers the download schema i associated with VPN subset V(i) (block 815). If download schema j covers download schema i (block 815), the cover analyzer 330 computes the cost c(i, j) of assigning routing information for VPN subset V(i) to download schema j using, for example, the example mathematical expression of EQN (5) (block 820). If the download schema j does not cover download schema i (block 815), the cost c(i, j) is set equal to a large value, such as infinity (block 825).

If there is another VPN subset V(i) to process (block 830), control returns to block 810 to select the next VPN subset V(i). If there are no more VPN subsets V(i) to process for the currently considered download schema j (block 830), the cover analyzer 320 determines whether there is another download schema j to process (block 835). If there is another download schema j to process (block 835), control returns to block 805 to select the next download schema j to process. If there are no more download schemas j to process (block 835), control exits from the example machine-accessible instructions of FIG. 8 to, for example, the example machine-accessible instructions of FIG. 5 at block 520.

Figure 9:
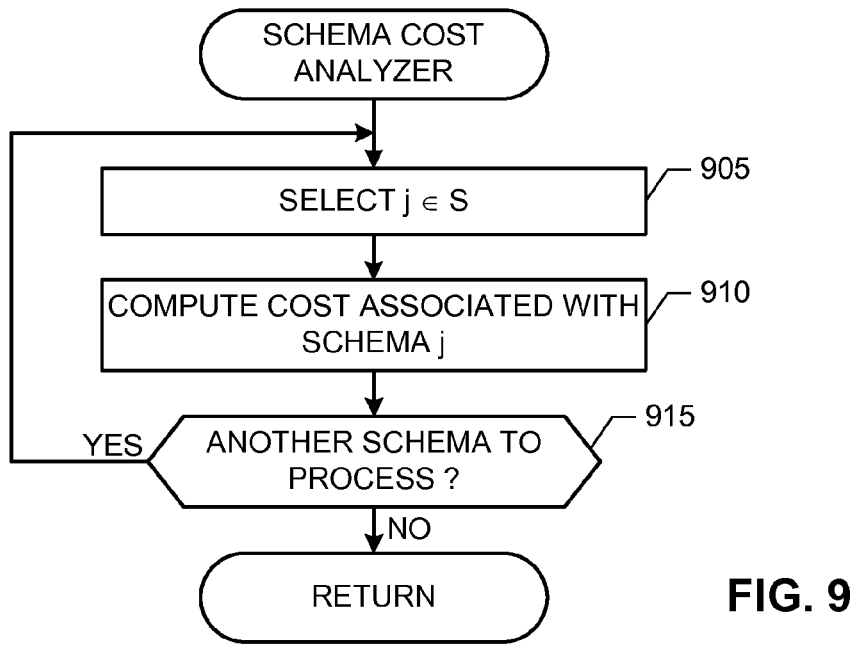

The example machine-accessible instructions of FIG. 9 may be executed to implement the example schema cost analyzer 325 of FIG. 3. The example machine-accessible instructions of FIG. 9 begin, for example, when called from the example machine-accessible instructions of FIG. 5 at block 520. The schema cost analyzer 325 selects a first download schema j from the set S of schemas (block 905) and computes a cost f(j) associated with the download schema j (block 910). In some examples the cost f(j) is proportional to the size of the download schema j. In other examples, the cost f(j) is constant, that is, independent of the number of linecards in download schema j.

If there is another download schema j to process (block 915), control returns to block 905 to select the next download schema j. If there are no more download schemas j to process (block 915), controls returns from the example machine-accessible instructions of FIG. 9 to, for example, the example machine-accessible instructions of FIG. 5 at block 525.

The example machine-accessible instructions of FIG. 10 may be executed to implement the example assignor 340 of FIG. 3. The example machine-accessible instructions of FIG. 10 are executed when, for example, called by the example machine-accessible instructions of FIG. 4 at block 430 when an interface on linecard L is provisioned for a VPN.

The example assignor 340 of FIG. 3 determines whether the VPN is a new VPN (block 1005). If the VPN is not new (block 1005), the assignor 340 determines whether the VPN already has equipment communicatively coupled to another interface on linecard L (block 1010). If the VPN already has equipment communicatively coupled to another interface on linecard L (block 1010), no change in routing table assignment needs to occur and control exits from the example machine-accessible instructions of FIG. 10 to, for example, the example machine-accessible instructions of FIG. 4 at block 425.

If the VPN is new (block 1005) or does not have equipment already communicatively coupled to the linecard L (block 1010), the assignor 1015 determines the subset z of linecards that are currently used by the VPN and assigns routing information for the VPN to the download schema j that covers the subset z with lowest cost c(z, j) (block 1015). The assignor sets x(z, j) to one and sets y(j) to one (block 1020). Control then exits from the example machine-accessible instructions of FIG. 10 to, for example, the example machine-accessible instructions of FIG. 4 at block 425.

Figure 11:
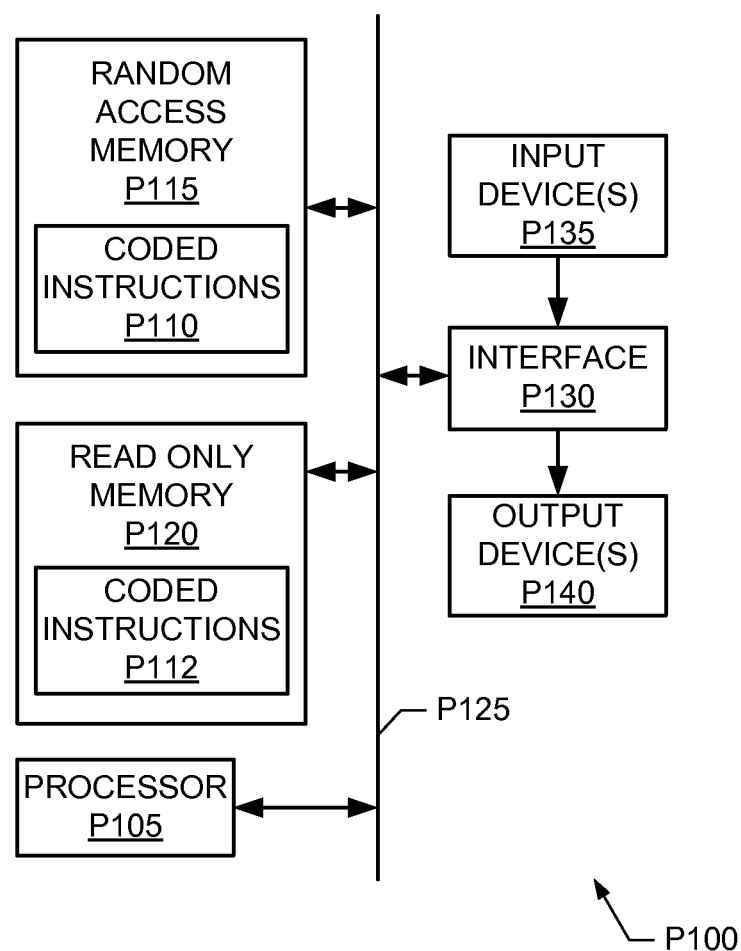
FIG. 11 is a schematic illustration of an example processor platform that may be used and/or programmed to carry out the example machine-accessible instructions of FIGS. 4-10, and/or to implement any or all of the example selective routing table assignment methods and apparatus described herein.

FIG. 11 is a schematic diagram of an example processor platform P100 that may be used and/or programmed to implement any of the example apparatus disclosed herein. For example, one or more general-purpose processors, processor cores, microcontrollers, etc can implement the processor platform P1100.

The processor platform P100 of the example of FIG. 11 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 4-10 and/or to selectively assign routing tables to router linecards as described herein.

The processor P105 is in communication with any number and/or type(s) of tangible computer-readable storage media (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to, for example, implement the example configuration database 125.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The input devices P135 and the output devices P140 may be used to implement any of the example database interface 305 and/or the example router interface 335.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
defining a first non-empty subset of linecards of a router and a second non-empty subset of the linecards of the router, wherein the second subset of the linecards differs from the first subset of the linecards;
identifying a first subset of virtual private networks having their associated interfaces implemented by the first subset of the linecards and a second subset of the virtual private networks having their associated interfaces implemented by the second subset of the linecards;
computing a cost associated with assigning routing information for the first subset of virtual private networks to the first subset of the linecards of a router by:
computing a first product of (1) a first number of routes associated with a first virtual private network of the first subset of the virtual private networks and (2) a second number of the linecards included in the first subset of the linecards;
computing a second product of (1) a second number of routes associated with a second virtual private network of the first subset of the virtual private networks and (2) the second number of the linecards included in the first subset of the linecards; and
computing the cost to be a sum of the first and second products;
solving an uncapacitated facility location problem with the computed cost for the first subset of virtual private networks to determine an assignment of at least one of the first subset or the second subset of the virtual private networks to at least one of the first subset or the second subset of the linecards of the router; and
configuring at least one of the first subset or the second subset of the linecards of the router with routing information for at least one of the first subset or the second subset of the virtual private networks based on the assignment, the particular subset of the linecards excluding at least one linecard of the router.

2. A method as defined in claim 1, further comprising initially configuring all of the linecards of the router with routing information for all of the virtual private networks, wherein the computing of the cost, the solving of the uncapacitated facility location problem and the configuring of at least one of the first subset or the second subset of the linecards of the router are performed subsequent to the initial configuring of all of the linecards of the router.

3. A method as defined in claim 1, further comprising at least one of periodically or aperiodically performing the computing of the cost, the solving of the uncapacitated facility location problem and the configuring of at least one of the first subset or the second subset of the linecards of the router.

4. An apparatus comprising:
a schema identifier to define a first non-empty subset of linecards of a router and to define a second non-empty subset of the linecards of the router, wherein the second subset of the linecards differs from the first subset of the linecards;
a subset identifier to identify a first subset of virtual private networks having their associated interfaces implemented by the first subset of the linecards, and to identify a second subset of the virtual private networks having their associated interfaces implemented by the second subset of the linecards;
a cover analyzer to compute a first cost of assigning routing information for the first subset of the virtual private networks to the first subset of the linecards by:
computing a first product of (1) a first number of routes associated with a first virtual private network of the first subset of the virtual private networks and (2) a second number of the linecards included in the first subset of the linecards;
computing a second product of (1) a second number of routes associated with a second virtual private network of the first subset of the virtual private networks and (2) the second number of the linecards included in the first subset of the linecards; and
computing the first cost as a sum of the first and second products;
an optimizer to determine whether to assign the first subset of the virtual private networks to the first subset of the linecards or to the second subset of the linecards based on the first cost; and
a router interface to configure the first subset of the linecards of the router with routing information for the first subset of the virtual private networks based on an output of the optimizer, wherein the first subset of the linecards is less than all of the linecards of the router.

5. An apparatus as defined in claim 4, further comprising a schema cost analyzer to compute a second cost associated with assigning routing information to the first subset of the linecards of the router, and a third cost associated with assigning routing information to the second subset of the linecards of the router, wherein the optimizer is to determine whether to assign the first subset of the virtual private networks to the first subset of the linecards or to the second subset of the linecards based on the first, second, and third costs.

6. An apparatus as defined in claim 4, wherein the optimizer is to define an uncapacitated facility location problem based on the first cost, and to solve the uncapacitated facility location problem to determine whether to assign the first subset of the virtual private networks to the first subset of the linecards or to the second subset of the linecards.

7. An apparatus as defined in claim 4, wherein the cover analyzer is to select the first subset of the virtual private networks so that all of the interfaces associated with the first subset of the virtual private networks are implemented by the first subset of the linecards.

8. An apparatus as defined in claim 4, further comprising an assigner to initially configure all of the linecards of the router with routing information for all of the virtual private networks.

9. A storage disk or storage device comprising machine readable instructions that, when executed, cause a machine to at least:
define a first non-empty subset of linecards of a router;
define a second non-empty subset of the linecards of the router, wherein the second subset of the linecards differs from the first subset of the linecards;
identify a first subset of virtual private networks having all their associated interfaces implemented by the first subset of the linecards;
identify a second subset of the virtual private networks having all their associated interfaces implemented by the second subset of the linecards;

compute a first cost of assigning routing information for the first subset of the virtual private networks to the first subset of the linecards by:
- computing a first product of (1) a first number of routes associated with a first virtual private network of the first subset of the virtual private networks and (2) a second number of the linecards included in the first subset of the linecards;
- computing a second product of (1) a second number of routes associated with a second virtual private network of the first subset of the virtual private networks and (2) the second number of the linecards included in the first subset of the linecards; and
- computing the first cost as a sum of the first and second products;

determine whether to assign the first subset of the virtual private networks to the first subset of the linecards or to the second subset of the linecards based on the first cost; and configure the first subset of the linecards of the router with routing information for the first subset of the virtual private networks when the first subset of the virtual private networks is assigned to the first subset of the linecards, the first subset of the linecards excluding at least one linecard of the router.

10. A storage disk or storage device as defined in claim 9, wherein the machine readable instructions, when executed, cause the machine to:
- compute a second cost associated with the first subset of the linecards of the router; and
- compute a third cost associated with the second subset of the linecards of the router, wherein determining whether to assign the first subset of the virtual private networks to the first subset of the linecards or to the second subset of the linecards is based on the first, second, and third costs.

11. A storage disk or storage device as defined in claim 8, wherein the machine readable instructions, when executed, cause the machine to determine whether to assign the first subset of the virtual private networks to the first subset of the linecards or to the second subset of the linecards based on the first cost by:
- defining an uncapacitated facility location problem based on the first cost; and
- solving the uncapacitated facility location problem to determine whether to assign the first subset of the VPNs to the first subset of the linecards or to the second subset of the linecards.

* * * * *